Sept. 8, 1936.  F. S. BURK  2,053,894
OIL TESTING DEVICE
Filed March 29, 1934  2 Sheets-Sheet 1
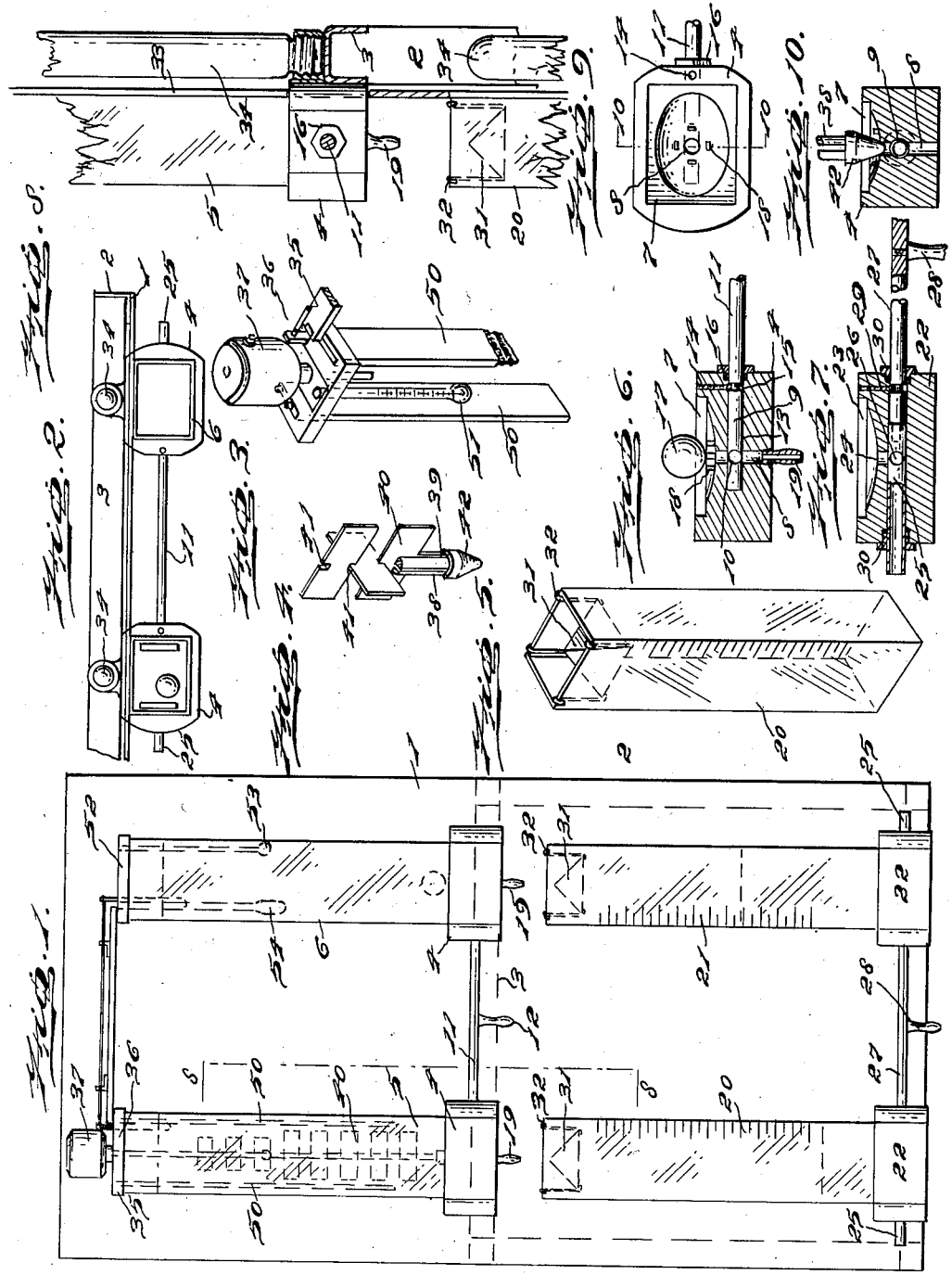
INVENTOR
Frederick S. Burk
BY
Herbert S. Fairbanks
ATTORNEY

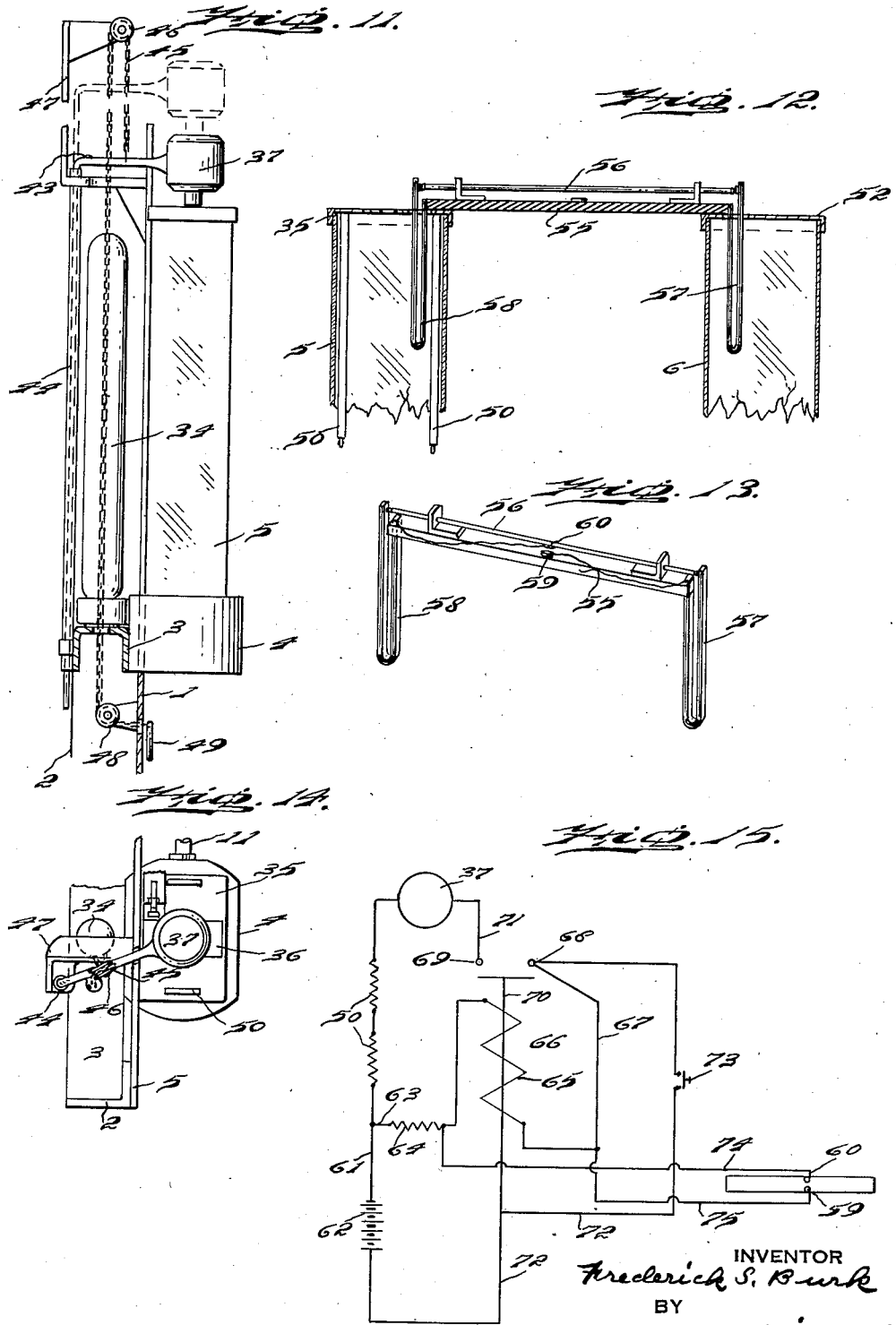

Patented Sept. 8, 1936

2,053,894

UNITED STATES PATENT OFFICE 2,053,894

OIL TESTING DEVICE

Frederick S. Burk, Audubon, N. J.

Application March 29, 1934, Serial No. 717,903

9 Claims. (Cl. 265—11)

In gasolene and oil filling stations as now conducted, no provision is made for testing the lubricating oil in the crank case of an automobile to visually indicate to a motorist the true physical properties of the oil so that he can determine for himself if an oil change is necessary. This is of especial advantage, since different cars are subjected to different operating conditions. The mileage covered by the car cannot be depended upon to determine when the oil should be changed, since many factors must be taken into consideration, such as the age and condition of the car, climatic conditions, starting and driving stresses, and the grade of oil which is being used for lubrication.

With the foregoing in view, one object of this invention is to devise a novel testing device which will enable one to make a comparative test in a few minutes of the used oil in the crank case and the same grade of new oil under exactly the same conditions to determine the specific gravity, viscosity, color, and the presence of carbon and other foreign matter.

A further object of the invention is to devise a novel testing device which can be employed to determine the anti-freeze quality of the cooling medium for the engine of the automobile.

A further object is to devise a novel testing device having containers for the standard new oil and for the used oil and novel means for causing such oils to flow from the containers into other containers in a thin, slow moving stream and prevent the formation of bubbles or foam which would render the readings inaccurate.

A further object is to devise novel means for heating the standard oil to substantially the same temperature as that of the oil to be tested, and novel means for agitating the oil during the heating operation.

With the above and other objects in view as will hereinafter clearly appear, my invention comprehends a novel testing device for making a comparative test of used oil and standard unused oil.

It further comprehends a novel constructing of a testing device to determine the decomposition of a liquid due to carbon deposition, acid formation, sludging, oxidation, dilution and changes in its physical properties.

It further comprehends novel means for heating the standard oil to substantially the same temperature as that of the used oil which has been taken from the crank case of the engine.

It further comprehends a novel construction and arrangement of containers and means for illuminating them, novel heating means, novel agitating means, novel valve mechanism, and means to automatically control the heating and agitating operations.

Other novel features of construction and advantage will hereinafter appear in the detailed description and the appended claims.

For the purpose of illustrating the invention, I have shown in the accompanying drawings a typical embodiment of it, which, in practice, will give satisfactory and reliable results. It is, however, to be understood that this embodiment is typical only and that the various instrumentalities of which my invention consists can be variously arranged and organized, and the invention is not limited to the precise arrangement and organization of these instrumentalities as herein set forth.

Figure 1 is a front elevation of a testing device embodying my invention.

Figure 2 is a top plan view.

Figure 3 is a perspective view of a portion of the device showing more particularly the manner in which the motor, heating units and other parts are removable as a unit, of structure.

Figure 4 is a perspective view of a portion of the agitator.

Figure 5 is a perspective view of one of the lower containers.

Figure 6 is a sectional view of the base of an upper container showing more particularly the valve passage and valve.

Figure 7 is a sectional view of the base of a lower container showing the valve passage and valve.

Figure 8 is a fragmentary sectional view taken on line 8—8 of Figure 1.

Figure 9 is a top plan view of the base seen in Figure 6.

Figure 10 is a sectional view taken on line 10—10 of Figure 9.

Figure 11 is an end elevation of a portion of the testing device.

Figure 12 is a sectional view, showing a portion of the upper containers and the automatic heat control.

Figure 13 is a perspective view of the heat control in detached position.

Figure 14 is a top plan view of Figure 11.

Figure 15 is a wiring diagram.

Similar numerals indicate corresponding parts.

Referring to the drawings.

The testing mechanism is mounted on a back plate 1, supported in any desired manner and provided with members to support parts of the mechanism. As illustrated, I employ a plate having the vertical angles 2 and the laterally extending channels 3. 4 designates the upper supports or bases for the upper containers 5 and 6 which are of the same size and capacity. As illustrated, they are rectangular in cross section but this is not essential and any desired contour may be used. These containers are transparent and preferably made of glass in the form of tubes open at their tops and bottoms. Each of the supports 4 are of the same construction and are recessed as at 7 at their upper ends to receive the lower ends of the containers. Each support 24 is provided with a discharge passage 8 controlled by a valve 9 having a port 10 extending through it at right angles to the longitudinal axis of the valve. The valve 9 forms part of a rod 11 having a handle 12. The rod 11 controls two valves of the same construction at each end so that liquid can be simultaneously discharged from the containers 5 and 6. The supports have laterally extending holes 13 to receive the valves and pins 14 extending into annular grooves 15 to retain the valves in position. Stuffing boxes 16 are also provided for the valve rod. As balls 17 are preferably used to determine the specific gravity of the liquids, ribs or lugs 18 are provided to prevent a ball closing the discharge passage 8. These discharge passages lead to nipples 19. The nipples 19 are disposed above lower containers 20 and 21 supported on the supports or bases 22 which are of the same construction. These supports 22 are recessed to receive their containers as at 23 and are provided with discharge ports 24 controlled by valves 25 having a port 26 opening through their peripheries and their free end. These valves 25 are connected by a valve rod 27 having a handle 28. When the valves 25 are open the liquid will simultaneously discharge from the containers 20 and 21. The lower supports 22 have a laterally extending hole through them to receive the valves which are held in place by a pin and groove arrangement as at 29 similar to that of the valves 9. 30 are stuffing boxes to prevent leakage. 31 designate deflectors suspended by hooks 32 at the upper ends of the lower containers 20 and 21.

The supports 4 and 22 are secured to the cross channels 3 in any desired manner. The back plate 1 is cut out in rear of the containers as at 33, see Figure 8, and electric lights 34 are positioned in rear of such openings to illuminate the containers and have their sockets carried by the cross channels 3. The upper container 5 is provided with a cover 35 having a removable section 36 carried by the hub of the casing of a motor 37, the shaft 38 of which is split at right angles as at 39 to receive the agitator blades 40 which have notches 41 to provide for their interlocking. The split sections of the shaft are secured together at the free end of the shaft by a conical shaped end member 42.

The motor 37 has an offset rod 43 which passes into a guide 44. The motor is raised by a cable 45 which passes over a pulley 46 carried by a bracket 47 and around a pulley 48 carried by the back plate and terminates in a ring 49, see Figure 11.

The fixed section 35 of the cover for the container 5 has depending from it the spaced electric heating units 50. The removable section 36 carries a thermometer 51.

The upper container 6 for the used oil has a cover 52 which carries a thermometer 53 and a hydrometer 54.

The thermostatic control for the electric circuit is shown in Figures 12 and 13 as an equalizing thermostat and consists of a bar of insulating material 55 on which is slidably mounted a rod 56. At the right hand end of the bar is a U shaped thermostat 57 which opens a predetermined amount per degree rise of temperature when heated, and at the other end of the bar is a thermostat 58 which closes the same amount per degree rise of temperature when heated. The thermostat 57 is electrically connected with a terminal 59 and the thermostat 58 is electrically connected with a terminal 60.

Referring now to the wiring diagram seen in Figure 15, the motor 37 and the electric heating units 50 are in series connection by line 61 with the source of electric supply 62. A line 63 from the line 61 is connected by a resistance 64 with the winding 65 of a relay 66. The winding 65 is connected by line 67 with contact 68 forming with contact 69 a pair of contacts cooperating with the armature 70 of the relay. The contact 69 is connected by line 71 with the motor 37. The armature 70 and contact 68 are connected with the source of electric supply 62 by line 72 which has a push button switch 73.

The input to the secondary winding 65 is connected by line 74 with the terminal 60 of the thermostat and the contact 59 is connected by line 75 with line 67.

Assuming now that it is desired to test used oil, a sample of the used oil is removed from the crank case of the automobile and placed in the upper container 6, the valve therefor being in closed position. The same amount of standard oil is placed in the upper container 5.

As the used oil is in a heated condition it is first necessary to bring the standard oil in the upper container 5 to the same temperature as the oil in the container 6.

The motor and removable cover section of the container 5 are lowered so that the agitator blades are in position and the end member as shown in Fig. 10 engages the walls of the inlet end of the discharge passage 8 so that the rotating agitator will maintain a vertical position, and the thermometer 51 is in the oil.

The push button is actuated to close the circuit and the current passes from the source of electric supply 62 by lines 61 and 63; resistance 64 energizing the winding 65 of the relay so that the armature closes the circuit through contacts 69 and 68. The current now flows by line 61, electric heating units 50 and motor 37 returning to the source of electric supply 62 by line 71 contacts 69 and 68 and line 72.

The current also passes by line 74 to the thermostat 58. The increase in temperature of the liquid in container 5 causes the free end of the thermostat 58 to move towards the right, moving with it the rod 56 until it contacts with the thermostat 57. The current can now flow by lines 61 and 63, resistance 64 line 74, contacts 60 and 59 and return to 62 by lines 75 and 72. This deenergizes the relay so that the circuit is broken at 69 and 68.

The oil in container 5 is now substantially the same temperature as that of the oil to be tested in the container 6. During the heating of the oil the motor 37 is driving the agitator to agitate the standard oil so that it will be uniformly heated.

The operator now draws downwardly on the chain 45 to remove the agitator and the thermometer 51. Balls or floats 17 are now placed in the containers 5 and 6 to visibly indicate the comparative gravity of the new and used oils.

The specific gravity of the used oil can also be read on the hydrometer 54.

The operator now actuates the valve handle 12 to open the valves for a definite time and permit the oil to pass from the upper to the lower containers through the viscosity tubes 19 and notes the relative quantities of oil in the lower containers 20 and 21.

The baffles 31 which are cone shaped or of a pyramid form prevent the formation of bubbles or foam and the oil passes slowly in a thin stream down along the walls of the lower containers so that comparative readings can be taken for viscosity. This flow to the lower containers also enables one to test for color, carbon and any foreign material contained in the used oil. The sample of used oil can be thrown away or returned to the crank case of the automobile from which it was taken.

Tests can also be made for specific gravity at 60° F. similar to laboratory tests and for viscosity at the usual specified Fahrenheit temperatures.

The containers may be graduated so that the quantities of liquid in them can be visibly determined.

Having thus described my invention, what I claim as new and desire to secure by Letters Patent is:

1. In a testing device, a pair of transparent containers, one of which is adapted to receive a heated liquid to be tested and the other of which is adapted to receive a standard liquid, said containers being arranged side by side for visible comparison of their liquids, an electric heating unit in the container for the standard liquid to heat the standard liquid, means controlled by the temperature of the used liquid to open the circuit of the electric heating unit when the standard liquid is heated to substantially the same temperature as that of the liquid to be tested, and means to agitate the standard liquid during the heating operation.

2. In a testing device, a pair of transparent containers one of which is adapted to receive a standard liquid and the other of which is adapted to receive a used liquid, means to apply heat directly to the standard liquid, means controlled by the temperature of the used liquid to control the heating means for the standard liquid, means to agitate the standard liquid during the heating operation, said containers being arranged side by side for visible comparison, and means to illuminate the containers.

3. In a testing device, transparent containers arranged in superimposed pairs, the pairs being vertically spaced from each other, with one container for a standard liquid and the other container of a pair for a used liquid, means to agitate and heat the standard liquid in an upper container and to automatically stop the heating and agitation when the standard liquid reaches the temperature of the used liquid and means to simultaneously discharge the liquids in the upper pair of containers into the lower pair of containers.

4. In a testing device, transparent containers arranged in vertically spaced pairs, one upper container being for a standard liquid and the other upper container being for a used liquid, the upper containers having discharge nipples at their lower ends, means controlled by the temperature of the used liquid to bring the standard liquid to substantially the same temperature, the lower containers being open at their upper ends to the atmosphere, baffles at the upper ends of the lower containers, and means to simultaneously discharge liquid from the upper containers into the lower containers.

5. In a testing device, a pair of transparent containers, one to receive a standard liquid and the other a sample of used liquid to be tested, electric heating units in the standard liquid container, an agitator in the standard liquid container, electrical means to actuate said agitator during the heating operation, and an electric circuit for said heating units and electrical means including thermostatic means subjected to the temperature of the standard and used liquids to automatically open the circuit when the standard liquid reaches the temperature of the used liquid.

6. In a testing device, a pair of transparent containers arranged side by side for comparison of their contents, lights in rear of said containers, one of said containers being adapted to receive a standard liquid and the other a sample of used liquid to be tested, electric heating units in the standard liquid to heat the standard liquid to substantially the same temperature as the used liquid, a motor in series with said heating units, an agitator driven by said motor and movable into said standard liquid container, means to pass electric current to said heating units and motor and means to control discharge of liquid from said containers.

7. In a testing device, transparent containers arranged side by side for comparison of their contents, one for a standard liquid and another for the used liquid to be tested, a cover having a fixed and removable section for the standard liquid container, electric heating units carried by the fixed cover section, a motor driven agitator carried by the removable cover section, means to raise the movable cover section and agitator out of the liquid in the standard liquid container, means to pass electric current to said heating units and said motor and means to control discharge of liquid from said containers simultaneously and in the same proportion for comparative testing of the standard and used liquid.

8. In a testing device, pairs of transparent containers, said pairs being superimposed one above the other in spaced relation with the upper and lower containers in alignment, one upper container being for a standard liquid and the other upper container being for a used liquid, means in the upper container for standard liquid to heat such liquid, means controlled by the temperature of the used liquid to control said heating means, baffles at the upper ends of the lower containers to cause liquid to flow along the sides in a thin stream, and means to simultaneously discharge liquid from the upper containers to the baffles in the lower containers.

9. In a testing device, upper and lower containers arranged in pairs with the pairs one above the other and vertically spaced from each other, the upper ends of the lower containers being open to the atmosphere, one upper and one lower container being for standard liquid and the other upper and lower container being for a liquid to be tested, means to simultaneously discharge liquid from the upper containers to the lower containers to make a comparative test of viscosity, color and foreign material of the two liquids, and means within the lower containers to direct the oil to their walls and thereby to prevent formation of bubbles or foam in the lower containers.

FREDERICK S. BURK.